3,370,110
PROCESS FOR PREPARING TOLUENE-ALPHA, ALPHA-DITHIOL BIS (O,O-DI LOWERALKYL PHOSPHORODITHIOATES)
Donald W. Stoutamire, Modesto, Calif., assignor to Shell Oil Company, New York, N.Y., a corporation of Delaware
No Drawing. Filed Feb. 24, 1964, Ser. No. 347,057
2 Claims. (Cl. 260—978)

This invention relates to a process for preparing valuable insecticides. More particularly, this invention relates to a process for manufacturing toluene-alpha,alpha-dithiol bis(O,O-dimethyl phosphorodithioate), and related compounds of the general formula:

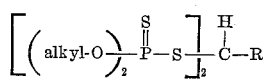

wherein each alkyl group contains from 1 to 4 carbon atoms and R is a monocyclic aromatic radical.

Toluene - alpha,alpha-dithiol bis(O,O-dimethyl phosphorodithioate) (for brevity, Compound A) has been found to be a highly effective insecticide, of particular value for control of mites, weevils, mosquitoes and worms. It therefore is desirable that there be available a process for its manufacture. Compound A is novel, so that the prior art does not teach a process for its preparation.

The most pertinent prior art known—U.S. Patents 2,873,228 and 2,882,198—teach that compounds of this class can be prepared by reacting a metal salt of the appropriate O,O-dialkyl dithiophosphoric acid with the appropriate aromatic-substituted methylene dihalide. However it has been found that such a process cannot be used to prepare Compound A, for application of the process of these patents to the reactants that the patents teach to be appropriate for the preparation of Compound A did not result in any detectable amount of that compound.

It now has been found that Compound A can be readily prepared in high yield by condensing O,O-dimethyl dithiophosphoric acid with benzaldehyde in the presence of a substantial amount of strong sulfuric acid. It further has been found that the reaction is applicable to the preparation of the corresponding O,O-di(lower alkyl) dithiophosphate relatives of Compound A, and to related compounds in which the phenyl group is substituted, by condensing the appropriate dithiophosphoric acid (alkyl-O—)$_2$P(S)(SH) (for brevity, TA, for "thioacid") with the appropriate aromatic aldehyde, RCHO, in the presence of a substantial amount of strong sulfuric acid.

In this process, the suitable thioacids are those O,O-di (lower alkyl) dithiophosphoric acids of the formula (alkyl-O—)$_2$P(S)(SH), wherein each alkyl group contains from 1 to 4 carbon atoms, and may be of either straight-chain or branched-chain configuration. Suitable TA reactants include, for example, the O,O-dimethyl, O,O-diethyl, O,O-dipropyl, O,O-diisopropyl, O,O-dibutyl, O,O-di-sec-butyl, O,O-di-tert-butyl, O-methyl, O-ethyl, O-methyl, O-propyl and O-ethyl, O-propyl esters of dithiophosphoric acid.

The suitable substituted aldehydes include those wherein the phenyl ring (i.e., R) is substituted by from one to a plurality of alkyl, halogen (particularly middle halogen—i.e., bromine and chlorine), nitro, hydroxy, cyano, amino (—NH$_2$, —NH(alkyl), —N(alkyl)$_2$) and/or alkoxy, in all of these cases, alkyl having the meaning already set out. In the process of the invention, aldehydes substituted by electron-withdrawing substituents, such as halogen and nitro, tend to be less reactive than those substituted by electron-donating substituents, such as hydroxy, alkoxy and alkyl. Typical examples of suitable aldehyde reactants include: benzaldehyde, o-nitrobenzaldehyde, p-nitrobenzaldehyde, 2,4-dichlorobenzaldehyde, 2,6-dichlorobenzaldehyde, 4-bromobenzaldehyde, 2-chlorobenzaldehyde, p-methoxybenzaldehyde, p-methylbenzaldehyde, o-hydroxybenzaldehyde, 2-chloro-4-methylbenzaldehyde, 2-chloro - 4-hydroxybenzaldehyde, p-aminobenzaldehyde, p-tertiary-butylbenzaldehyde, 3,5-dimethoxybenzaldehyde, and the like.

The condensation is effected by mixing the two reactants in the presence of a substantial amount of strong sulfuric acid. By "strong sulfuric acid" is meant sulfuric acid containing at least 70% by weight H$_2$SO$_4$. The acid strength should not exceed 100% H$_2$SO$_4$, fuming sulfuric acid—oleum—not being suitable, and preferably the acid strength should not exceed about 95% by weight H$_2$SO$_4$, because the oxidizing power of the acid increases with the acid strength and at strengths above about 95%, the acid may tend to cause undesirable side reactions. In most cases, it will be found that optimum conversions and yields of desired product will be obtained when the acid strength is of the order of about 80–85% by weight H$_2$SO$_4$. By "substantial amount" is meant at least one mole of the acid (as H$_2$SO$_4$) per mole of the aldehyde reactant, and it will generally be found desirable to employ at least about two moles of acid per mole of the aldehyde. It will seldom be found necessary to employ more than about four moles of acid per mole of the aldehyde, and in most cases, it will be found best to employ from about 3 to about 4 moles of acid per mole of aldehyde.

While good results are obtained by employing about the stoichiometric amounts of the TA reactant and aldehyde—i.e., about two moles of TA reactant per mole of aldehyde—in most cases, it will be found desirable to employ a slight to moderate excess—say, 5 to 50% excess—of the TA reactant. This is not to say, however, that it may not be found to be desirable in particular cases to have a slight to moderate excess of the aldehyde.

The manner in which the process of this invention is conducted—the way in which the three materials, aldehyde, TA and sulfuric acid, are brought together—is important, because of the relative reactivities of the three materials, each with the other, and with byproducts that can be formed. While the condensation of the TA with the aldehyde is very rapid, other reactions also are possible, albeit somewhat slower, so that to effect the condensation with minimum side reaction requires that when the three materials are brought together they can be rapidly and intimately mixed. Because the TA reactants are in general unstable in the presence of the acid, it is impractical to attempt to first mix the TA and acid, and then add the aldehyde. It is possible to first mix the aldehyde with the acid, then add the TA, since the aldehydes generally are sufficiently stable in the acid; however, when the TA is added, it must be added all at once, with adequate stirring to avoid side reactions. Since the condensation reaction is exothermic, adequate cooling means must be provided to avoid undesirably high reaction mixture temperatures, and/or the reactants must be precooled. The TA and aldehyde are stable in each other's presence, so that it is feasible first to mix these reactants, and then add the acid. It appears that in this case, it is not so essential that all of the acid be added at once, but it appears that the acid may be added incrementally over a period of time without any marked adverse effect upon the condensation. However, it is necessary that the acid be thoroughly mixed with the reaction mixture substantially as fast as it is introduced into the mixture. These conclusions follow from the function of the acid. Primarily, it appears that the acid effectively removes the water of reaction, or binds it so that the condensation can go to completion, and that the presence of unbound water of reaction does not lead to side reactions to any significant degree, so that the rate at which the acid is introduced is not overly critical. However, the acid can promote other side reactions, so that if a local excess of acid is permitted, then undesirable side reactions can be expected—such is avoided by prompt, thorough mixing. Based on these considerations, it would appear that if batch operation is contemplated, the last technique—introduction of acid into a premix of aldehyde and TA—is to be preferred, whereas if continuous operation is contemplated, this procedure could be used, or the TA can be added to a premix of aldehyde and acid, or the three materials can be combined substantially at the same time.

The condensation proceeds readily, in most cases without requiring that the mixture be heated. However, in some cases, gentle heating of the mixture may be required to initiate the reaction, and/or the mixture later may be heated gently to insure that reaction is complete. Suitable reaction temperatures lie within the range of from about 15° C. to about 100° C., with preferred temperatures being of the order of about 30–60° C.

The pressure under which the reaction is conducted is not known to be critical to the attainment of the desired product. Substantially atmospheric, superatmospheric or subatmospheric pressures may be employed as convenient or required by the physical characteristics of the components of the reaction mixture.

The product of the process of this invention ordinarily is most effectively and conveniently recovered by stripping any light materials from the crude reaction mixture, and/or extracting the mixture with a selective solvent, then employing crystallization techniques to isolate and purify the product.

It has not been found necessary to employ a solvent or diluent in the reaction mixture. However, to moderate the reaction an inert liquid may be used, suitable liquids including aromatic hydrocarbons, such as benzene, cycloalkanes such as cyclohexane, cyclopentane or chlorinated hydrocarbons such as chloroform, carbon tetrachloride, chlorobenzenes and the like.

The following specific examples of the conduct of the process of the invention are set forth to illustrate application of the process in particular instances. In these examples, "parts" means parts by weight unless otherwise expressly indicated, and parts by weight bears the same relationship to parts by volume as does the kilogram to the liter.

*Example I*

A mixture of 16 parts of O,O-dimethyl dithiophosphoric acid and 5.3 parts of benzaldehyde was cooled to 5° C. 10 parts by volume of 80% sulfuric acid was added all at once and the mixture was thoroughly stirred. The temperature of the mixture rose to 60° C., then was cooled to 40° C. and allowed to stand for about 5 minutes. The mixture then was poured into cold water. Seeding with a crystal of Compound A caused crystallization. The resulting solid was ground with cold water in a mortar and filtered, washed with sodium bicarbonate solution, then water, and then dried to constant weight to give 16.4 parts (81% yield) of Compound A, identified by comparison with a known sample of Compound A.

*Example II*

A mixture of 16 parts of O,O-dimethyl dithiophosphoric acid and 5.3 parts of benzaldehyde was cooled to −15° C., then 2 parts by volume of 95% sulfuric acid was added with mixing. The temperature of the mixture rose to 41° C., at which point one more part by volume of the acid was added, whereupon the temperature of the mixture rose to 48° C. The mixture then was poured into cold water, allowed to crystallize and worked up as in Example I. Yield of Compound A: 18.6 parts (91%).

*Example III*

A mixture of 10.6 parts of benzaldehyde and 38 parts of technical O,O-dimethyl dithiophosphoric acid (88% pure) was cooled to 5° C. and 20 parts by volume of 80% sulfuric acid was added all at once, with stirring and cooling to maintain the reaction mixture temperature at 30–35° C. After 10 minutes at this temperature, the mixture was cooled, diluted with cold water, and extracted with 100 parts by volume of ether. The organic phase was washed with water and dried, and the product was crystallized at −70° C. Filtration gave 29.5 parts (73% yield) of Compound A. The filtrate was concentrated and crystallized at −70° C. to give an additional 2.4 parts (6% yield) of Compound A.

I claim as my invention:

1. In the process for the preparation of a compound of the formula

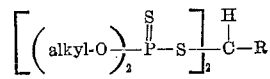

wherein each alkyl contains from 1 to 4 carbon atoms and R represents a mononuclear aromatic radical, which process comprises reacting an O,O-dialkyl dithiophosphoric acid, (alkyl—O—)₂P(S)(SH), with a mononuclear aromatic aldehyde substituted by one to a plurality of radical(s) selected from the group of hydrogen, bromine, chlorine, nitro, hydroxy, cyano; and NH(alkyl), N(alkyl)₂ and alkoxy wherein the alkyl is from 1 to 4 carbon atoms, wherein the improvement comprises conducting the reaction in the presence of sulfuric acid of about 70% to 100% by weight sulfuric acid, wherein the sulfuric acid: aldehyde mole ratio is about 1:1 to 1:5, at a temperature between about 15° C. to 100° C.

2. A process for the preparation of toluene-alpha, alpha - dithiol bis - (O,O-dimethyl phosphorodithioate) which comprises reacting O,O-dimethyl dithiophosphoric acid with benzaldehyde wherein the improvement comprises conducting the reaction in the presence of sulfuric acid of about 70% to 100% by weight sulfuric acid wherein the sulfuric acid: aldehyde mole ratio is about 1:1 to 1:5, at a temperature between about 15° C. to 100° C.

References Cited

UNITED STATES PATENTS 2,736,737   2/1956   Morris _____ 260—928

CHARLES B. PARKER, *Primary Examiner.*

A. H. SUTTO, *Assistant Examiner.*